United States Patent [19]
Bounds

[11] Patent Number: 6,045,442
[45] Date of Patent: Apr. 4, 2000

[54] NON-ROTATING, HEAVY DUTY GAME HOIST

[76] Inventor: Richard W Bounds, Rte. 1, Box 226, Roxie, Miss. 39661

[21] Appl. No.: 09/195,395

[22] Filed: Nov. 18, 1998

[51] Int. Cl.[7] .................................................. A22B 1/00
[52] U.S. Cl. ........................ 452/187; 452/189; 452/192; 452/133; 182/133
[58] Field of Search .................................. 452/187, 189, 452/191, 192

[56] References Cited

U.S. PATENT DOCUMENTS

| | | |
|---|---|---|
| 4,860,404 | 8/1989 | Flachs . |
| 4,909,555 | 3/1990 | Blasi . |
| 5,263,675 | 11/1993 | Roberts et al. . |
| 5,393,194 | 2/1995 | Smith . |
| 5,395,284 | 3/1995 | Frisk . |
| 5,417,609 | 5/1995 | Oldham . |
| 5,562,534 | 10/1996 | McGough . |
| 5,588,907 | 12/1996 | DePietro et al. ........................ 452/187 |
| 5,626,514 | 5/1997 | Rothove ................................. 452/187 |
| 5,662,451 | 9/1997 | Muzzi et al. . |
| 5,791,858 | 8/1998 | Sasser ..................................... 452/187 |
| 5,820,455 | 10/1998 | Breedlove ............................... 452/189 |

*Primary Examiner*—Willis Little
*Attorney, Agent, or Firm*—Joseph T. Regard, Ltd.

[57] ABSTRACT

A heavy-duty game hoist for suspending large game, such as deer, or other animals for processing in a stable, non-rotating manner. The preferred embodiment of the present invention contemplates a hoist configured to be affixed to a pole, tree, or the like, the hoist including a first vertical support member which engages the pole or tree, the first vertical support member engaging a frame which includes a laterally emanating horizontal support member having first and second ends, the first end engaging the first vertical support member, the second end distal from the first vertical support member, the second end of the horizontal support member supporting a second vertical support member. In the preferred embodiment, the second vertical support member has a square or other configured conduit formed longitudinally therethrough, and is configured to telescopically engage a vertical boom member which includes a gambrel for engaging and supporting the game. In use, the vertical boom member may have affixed thereto a cable which is raised or lowered telescopically into the second vertical support member via a winch or the like, providing a non-rotating, stable, lifting and support means for processing suspended game.

7 Claims, 3 Drawing Sheets

NON-ROTATING, HEAVY DUTY GAME HOIST

TECHNICAL FIELD OF THE INVENTION

The present invention relates to hoists, and in particular to a heavy-duty game hoist for suspending a large animal carcass, such as deer, or other animal via a gambrel for processing in a stable, non-rotating manner.

The preferred embodiment of the present invention contemplates a hoist configured to be affixed to a pole, tree, or the like, the hoist including a first vertical support member which engages the pole or tree, the first vertical support member engaging a frame which includes a laterally emanating horizontal support member having first and second ends, the first end engaging the first vertical support member, the second end distal from the first vertical support member, the second end of the horizontal support member supporting a second vertical support member.

In the preferred embodiment, the second vertical support member has a square or other configured conduit formed longitudinally therethrough, and is configured to telescopically engage a vertical gambrel support member which includes a gambrel for engaging and supporting the carcass.

In use, the vertical boom member may have affixed thereto a cable which is raised or lowered telescopically into the second vertical support member via a winch or the like, providing a non-rotating, stable, lifting and support means for processing suspended carcass.

BACKGROUND OF THE INVENTION

While the prior art has contemplated many and diverse portable and fixed game and animal winches configured to support game via gambrel or other means, none are believed to contemplate or suggest the stable, non-rotating configuration of the present invention.

A list of patents which may have some pertinence to the present invention may include:

| U.S. Pat. No. | Inventor | Issue Date |
| --- | --- | --- |
| 5662451 | Muzzi et al | 09/02/1997 |
| 5562534 | McGough | 10/08/1996 |
| 5417609 | Oldham | 05/23/1995 |
| 5395284 | Frisk | 03/07/1995 |
| 5393194 | Smith | 02/28/1995 |
| 5263675 | Roberts et al | 11/23/1993 |
| 4909555 | Blasi | 05/20/1990 |
| 4860404 | Flachs | 08/29/1989 |

U.S. Pat. No. 5,662,534 teaches a "Game Hoist and Skinning Aid" which includes a horizontal support frame configured to engage a vertical support such as a tree, the frame further including a winch configured to raise a deer via cable supported by the horizontal support frame (FIG. 1); the winch and cable may also be used in skinning the animal by affixing the cable to the hide and winching the cable. U.S. Pat. No. 5,263,675 shares some teachings with the '534 patent further illustrating the use of a telescoping gambrel for providing adjustable widths.

U.S. Pat. Nos. 5,393,194, 5,662,451, and 5,395,284 teach game hoists which include various telescoping booms, none of which, however, contemplate the non-rotating carcass support of the present invention, the telescoping booms limited to a means of adjustment, and not a means of supporting the gambrel or other carcass support in a stable, non-rotating fashion.

GENERAL SUMMARY DISCUSSION OF THE INVENTION

The present invention provides a game hoist for supporting a large carcass or the like in a manner which is more stable, safer, and easier to implement than the prior art, in a mechanism which is relatively easily installed and maintained, at a reasonable cost.

The present invention provides a heavy-duty game hoist for suspending a large carcass such as deer or other game, or other animal for processing, comprising a hoist configured to be affixed to a pole, tree, or the like, the hoist further comprising a first vertical support member which engages the pole or tree, the first vertical support member forming a portion of a frame which emanates from the pole or tree in a generally lateral fashion, via a horizontal support member having first and second ends, the first end engaging the first vertical support member, the second end distal from the first vertical support member, the second end of the horizontal support member supporting a second vertical support member.

In the preferred embodiment, the second vertical support member has a square or other configured conduit formed longitudinally therethrough, and is configured to telescopically engage a gambrel support member which engages a gambrel or the like configured to engage and support the game. While the vertical boom member is vertically supported in a non-rotating fashion, the system is configured to allow for pivotal adjustment of the gambrel position upon demand, to allow for convenient positioning of the carcass during skinning, gutting, or other processing.

In use, the vertical boom member is raised or lowered via a cable, telescopically engaging the second vertical support member, which is supported by the frame, the cable controlled via a winch or the like, thus providing a non-rotating, stable, lifting and support means for processing suspended game.

It is therefore an object of the present invention to provide a hoist for supporting a carcass or the like which is non-pivoting.

It is another object of the present invention to provide a hoist which is easily installed to a vertical support such as a pole, tree, or the like.

It is another object of the present invention to provide a hoist configured to lift and secure a large carcass in a safe and relatively easily implemented manner.

It is still another object of the present invention to provide a hoist which is adjustable.

Lastly, it is an object of the present invention to provide a hoist for large carcasses which allows repositioning of the gambrel vis a vis the frame, such that, once adjusted, the supported carcass remains in a fixed, supported position.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE INVENTION

Figure 1:
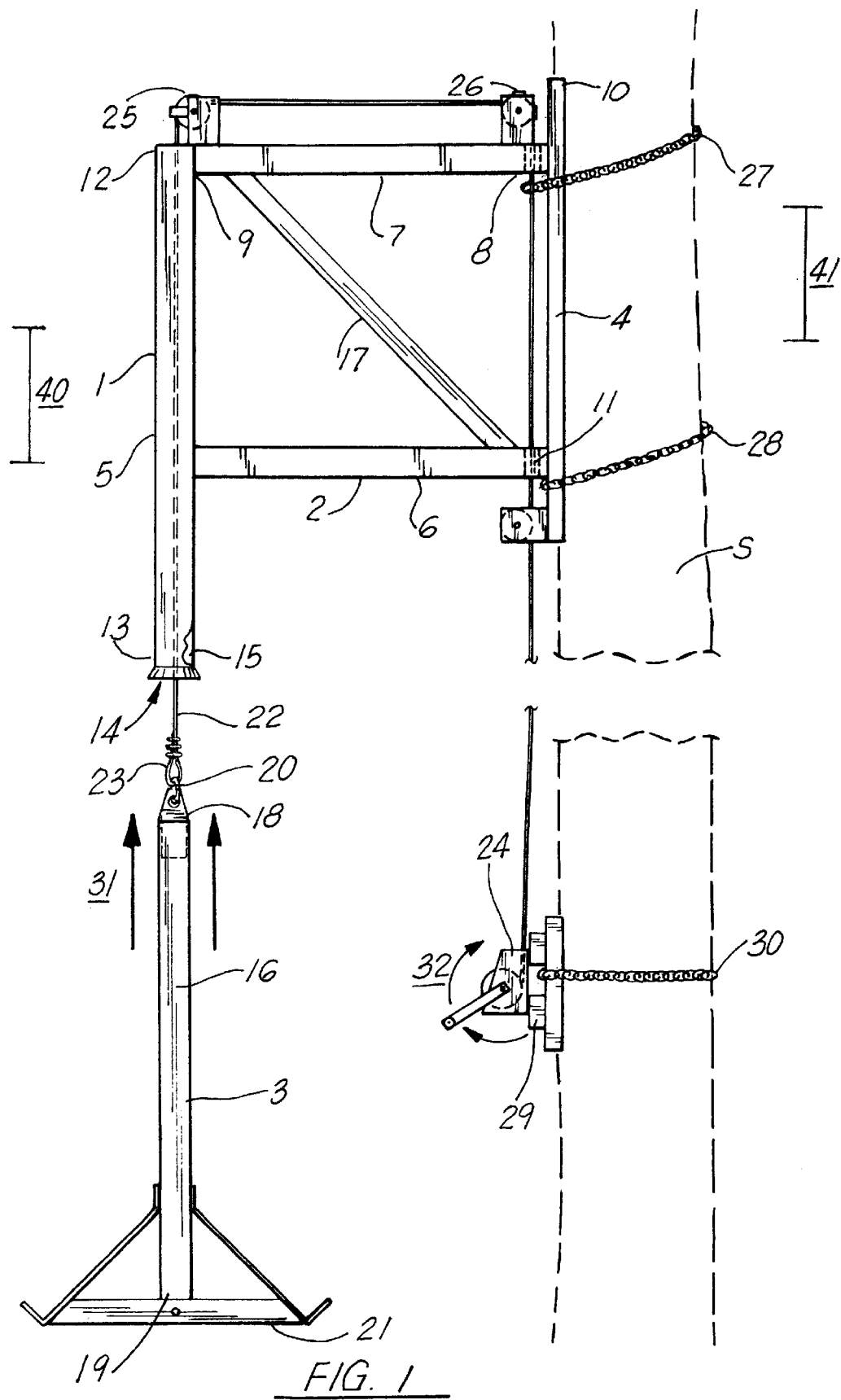
FIG. 1 is a side view of the preferred embodiment of the hoist of the present invention, illustrating the unit affixed to a tree and the telescopic engagement of the gambrel support member into the second vertical support member.

Referring to FIG. 1 of the drawings, the preferred embodiment of the carcass/game hoist of the present invention comprises a hoist 1 including a frame 2 configured to engage a vertical support S which may comprise, for example, a tree or pole, via chains 27, 28, 30 or the like, the frame configured to engage in spaced relationship from vertical support S a gambrel support 3 in telescoping fashion, as will be further disclosed infra. As shown, in the preferred embodiment of the present invention, the second vertical member 5 has a longitudinal axis 40 in general alignment with the longitudinal axis 41 or the vertical support S.

As shown, the frame comprises a first 4 vertical member positioned to engage vertical support S, the first 4 and second 5 vertical members having first 10, 12 and second 11, 13 ends, respectively, having spaced therebetween second 7 and first 6 horizontal support members, respectively. Each horizontal support member 6, 7 has first 8 and second 9 ends, and may be reinforced via brace 17.

Figure 2:
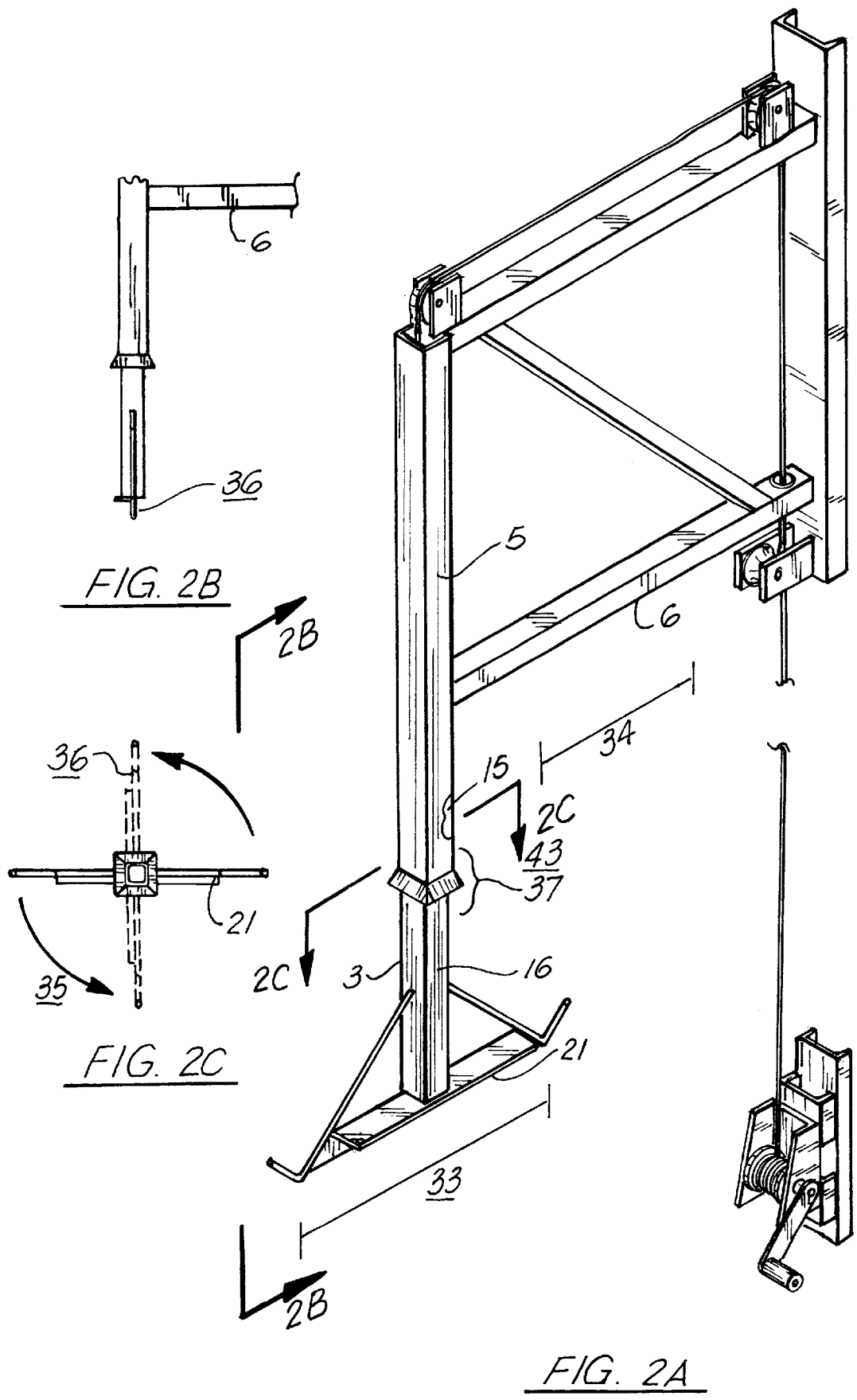
FIG. 2A is an upper, isometric view of the invention of FIG. 1, illustrating the gambrel support member in telescoping communication with the second vertical support member.
FIG. 2B is a side, close-up view of the invention of FIG. 2A, illustrating another view of the telescoping communication of the gambrel support member with the second vertical support member.
FIG. 2C is a top view of the adjustment of the gambrel support member to a secondary engagement position with the second vertical support member.
Figure 3:
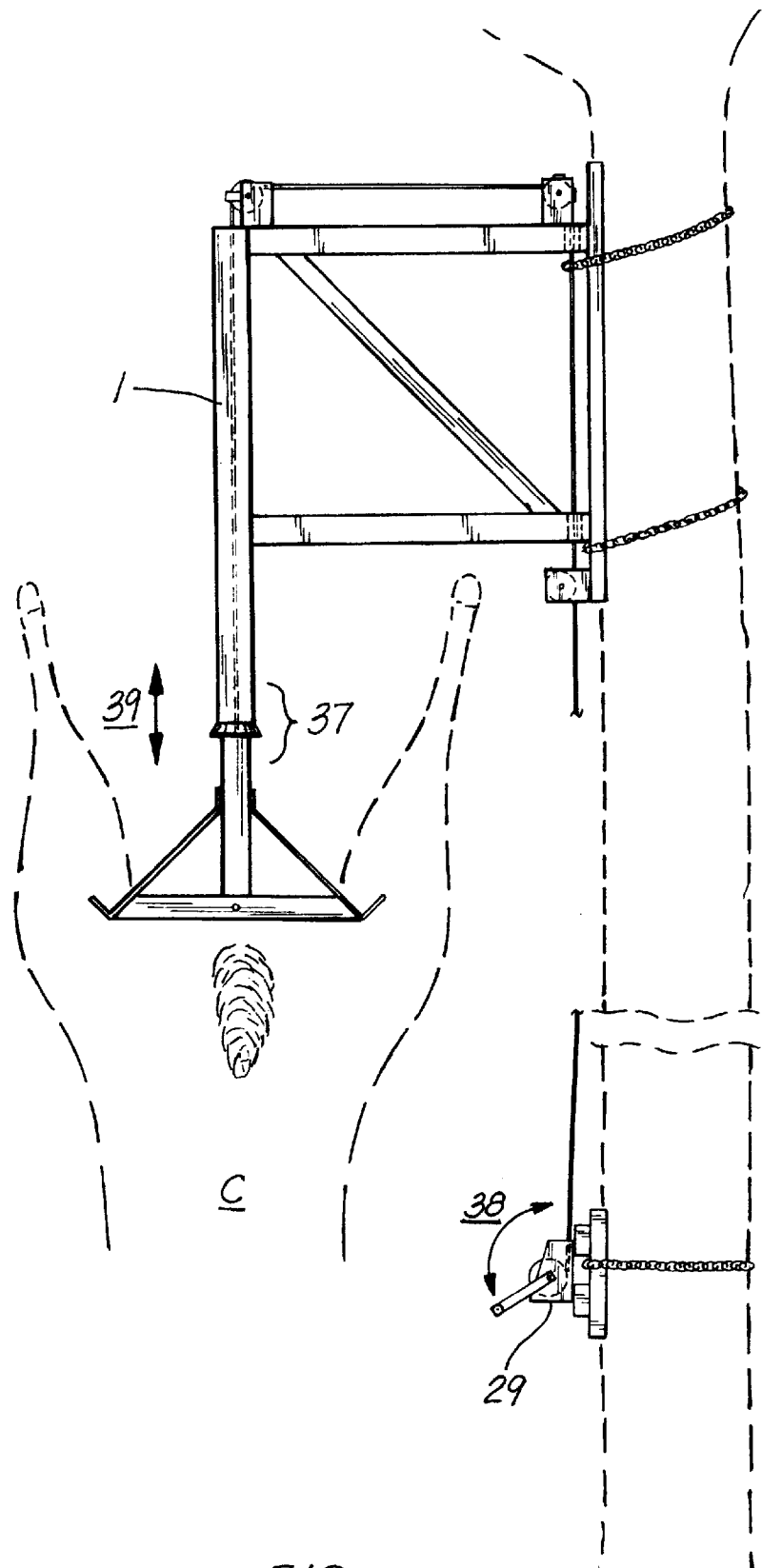
FIG. 3 is a side view of the invention of FIG. 1, illustrating the system securely supporting a game carcass in non-rotating fashion.

Continuing with FIGS. 1, 2A, and 3 the second vertical member 5 has a conduit formed therein 14 configured to engage gambrel support 3, with the gambrel support 3 having an outer wall 16 configured to engage the inner wall 15 of conduit 14, the gambrel support 3 configured to engage second vertical support member 5 in such a manner as to prevent rotational movement 42, while allowing vertical 39, telescoping 37 engagement. As shown, (as an example), the configuration of the outer wall 16 of gambrel support 3, and the inner wall 15 of conduit 14 may have a square configuration, and are dimensioned to allow telescoping engagement of the gambrel support within conduit in a keyed fashion, so as to prevent axial rotation of said gambrel support member; other geometrical configurations could also be utilized, although a circular configuration would generally require, for example, a female slot formed in, for example, the gambrel support member, and a male key configured to engage said slot formed in said conduit formed in the second vertical support member, or visa-versa.

Continuing with the figures, gambrel support 3 has first 18 and second 19 ends, the first end 18 having a cable connector 20 thereon, the second end 19 having a gambrel 21 thereon situated in transverse fashion.

Cable 22 engages cable connector 20 and winch 29 at its first 23 and second 24 ends, respectively, and is supported via pulleys 25, 26, a with the portion of the cable supported by pulley 25 preferably passing through conduit 14, engaging cable gambrel support 3 via cable connector 20.

In order to lift 31 gambrel support 3, winch 29 is cranked 32, drawing in cable 22, and lifting gambrel support 3 into and through conduit 14 via pulley 25; adjustment 38 of winch 29 therefore effects vertical adjustment 39 of gambrel support vis a vis second vertical member 5.

As shown in FIGS. 1 and 2A, gambrel support 3 may engage second vertical member 5 such that the longitudinal axis 33 of gambrel 21 is aligned with the longitudinal axis 34 of horizontal support member 6, providing a first position, or may be pivotally adjusted by lowering 43 cable via winch, lowering gambrel support 3, such that the first end 18 is disengaged from conduit 14 (FIG. 1), and rotating 35 (FIG. 2C) gambrel 21 such that the longitudinal axis 36 of gambrel is in transverse alignment with the longitudinal axis 34 of horizontal support (FIG. 2A), thereby providing a second position.

Continuing with FIGS. 1, 2A, and 3, the user would mount the carcass C to the gambrel 21, pivotally 36 adjust the gambrel to the desired first or second position, as discussed above, aligning the gambrel support member and the second vertical support member to provide for keyed, telescopic engagement, then utilize the winch 29 (by cranking 38 same) to lift 39 the gambrel support 3 so as to telescopically engage 37 the second vertical member 5, until the game is at the desired height for processing. The user may then utilize the hoist system 1 to support the carcass C in a sturdy, non-rotating fashion while processing same, and, when completed, may lower 43 the gambrel support member 3 via winch 29.

Alternative designs to the present invention may include the utilization of friction rollers, sprocket, or rack & pinion arrangement (or other arrangement) for engaging the gambrel support member at the second vertical support member as a substitute for cables; further, the gambrel support member may telescopically engage a bracket or sleeve affixed to the frame, as opposed to the conduit formed in the second vertical support member, as contemplated in the preferred embodiment of the invention supra.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A hoist for lifting and supporting an animal carcass in a stable manner, comprising:

a rigid, non-flexible vertical support member having a longitudinal axis, said vertical support member supported by a frame;

a rigid, non-flexible gambrel support member having first and second ends and a longitudinal axis, said first end of said gambrel support member engaging a gambrel, said second end of said gambrel support member configured to telescopically engage said vertical support member, so as to provide variable, longitudinal, telescopic engagement;

positioning means to lift said gambrel support member, said positioning means further configured to vary said telescopic engagement of said vertical support member with said gambrel support member;

holding means to prevent axial rotation of said longitudinal axis of said gambrel support member while said gambrel support member is in telescopic engagement with said vertical support member.

2. The hoist of claim 1, wherein said positioning means further comprises:

a cable having first and second ends, said first end of said cable engaging said second end of said gambrel support member, said second end of said cable engaging a winch.

3. The hoist of claim 2, wherein said vertical support member has formed therein a longitudinal conduit configured to telescopically engage said gambrel support member.

4. The hoist of claim 3, wherein the longitudinal conduit of said vertical support member has a square configuration, and said gambrel support member has an outer wall having a square configuration configured to engage said square configuration of said longitudinal conduit formed in said vertical support member.

5. The hoist of claim 3, wherein said holding means comprises a keyed engagement of said telescopic engagement of said gambrel support member with said vertical support member to prevent axial rotation of said longitudinal axis of said gambrel support member.

6. The method of lifting and supporting an animal carcass in a stable manner, comprising the steps of:
   a. providing a hoist, comprising:
      a rigid, non-flexible vertical support member having a longitudinal axis, said vertical support member supported by a frame;
      a rigid, non-flexible gambrel support member having first and second ends and a longitudinal axis, said first end of said gambrel support member engaging a gambrel, said second end of said gambrel support member configured to telescopically engage said vertical support member, so as to provide variable, longitudinal, telescopic engagement;
      positioning means to lift said gambrel support member, said positioning means further configured to vary said telescopic engagement of said vertical support member with said gambrel support member;
      holding means to prevent axial rotation of said longitudinal axis of said gambrel support member while said gambrel support member is in telescopic engagement with said vertical support member;
   b. mounting an animal carcass upon said gambrel;
   c. utilizing said positioning means to lift said gambrel and said gambrel support member;
   d. engaging said gambrel support member with said vertical support member in telescoping fashion;
   e. varying said telescopic engagement of said vertical support member with said gambrel support member, while
   f. utilizing said holding means to prevent axial rotation of said longitudinal axis of said gambrel support member while said gambrel support member is in telescopic engagement with said vertical support member.

7. The method of claim 6, wherein in step "a", providing said holding means comprises the further step of providing a keyed engagement of said telescopic engagement of said gambrel support member with said vertical support member to prevent axial rotation of said longitudinal axis of said gambrel support member, and in step "d", there is provided the further step of aligning said gambrel support member with said vertical support member so as allow said gambrel support member to telescopically engage said vertical support member in keyed fashion.

* * * * *